United States Patent [19]

Fujimoto

[11] Patent Number: 4,885,695
[45] Date of Patent: Dec. 5, 1989

[54] NUMERICAL CONTROL DEVICE WITH GENERAL PURPOSE SETTING DISPLAY

[75] Inventor: Akihiko Fujimoto, Aichi, Japan

[73] Assignee: Mitsubishi Denki Kabushiki Kaisha, Tokyo, Japan

[21] Appl. No.: 342,612

[22] Filed: Apr. 19, 1989

Related U.S. Application Data

[60] Continuation of Ser. No. 118,003, Oct. 29, 1987, abandoned, which is a division of Ser. No. 768,602, Aug. 23, 1985, Pat. No. 4,739,468.

[30] Foreign Application Priority Data

Aug. 24, 1984 [JP] Japan ................... 59-175239

[51] Int. Cl.$^4$ .................. G06F 15/46; G05B 19/18
[52] U.S. Cl. ................. 364/474.23; 364/191; 364/474.22
[58] Field of Search .............. 364/474.22–474.27, 364/188, 189, 191–193; 318/568

[56] References Cited

U.S. PATENT DOCUMENTS

| 4,092,719 | 5/1978 | Salmon ................... 364/468 |
| 4,149,235 | 4/1979 | Froyd et al. .............. 364/474 X |
| 4,439,834 | 3/1984 | Dahlgren, Jr. ............. 364/474 |
| 4,443,865 | 4/1984 | Schultz et al. ............ 364/900 |
| 4,521,860 | 6/1985 | Kanematsu et al. ......... 364/191 X |

Primary Examiner—Joseph Ruggiero
Attorney, Agent, or Firm—Sughrue, Mion, Zinn, Macpeak & Seas

[57] ABSTRACT

A numerical control device which is capable of using a general-purpose setting display section to display machining data for controlling a machine tool or the like. The machining data can be displayed in character or graphic form, and internal processing is carried out using a high level language. A transmitting and receiving unit is interfaced with the general-purpose setting display section using a standard serial data interface to transmit the display data using the high level language.

3 Claims, 4 Drawing Sheets

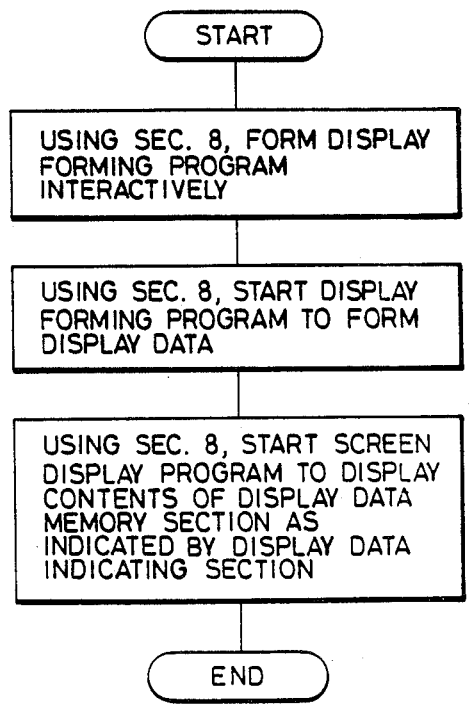

NUMERICAL CONTROL DEVICE WITH GENERAL PURPOSE SETTING DISPLAY

This is a continuation of application Ser. No. 118,003 filed Oct. 29, 1987, abandoned, which is a divisional of application Ser. No. 768,602, filed Aug. 23, 1985, now U.S. Pat, No. 4,739,468.

BACKGROUND OF THE INVENTION

The present invention relates to a numerical control device which uses a general-purpose setting display section to display machining data, etc., for a numerical control device used to numerically control a machine tool or the like.

A conventional numerical control device of the same general type to which the invention pertains is shown in FIG. 1. In FIG. 1, reference numeral 1 designates a paper tape on which machining data has been recorded; 2, an input section for inputting this data; 3, a control section implemented with a CPU (central processing unit); 4, a movable arithmetic section for converting the machining data into movable data; 5, a memory section for temporarily storing the machining data; 6, an output section for outputting machining instruction data from the control section 3; and 7, a machine tool which is operated automatically according to the control section 3, the movable arithmetic section 4, the memory section 5, and the output section 6 forming a numerical control section 10.

The setting display section 8, which serves as a man-machine interface for the numerical control section only, includes a display unit (not shown) and an operating board, namely, a keyboard (not shown). The setting display section 8 is exclusively connected to a data transmitting and receiving circuit 9 provided in the control section 3. The display unit fixedly displays in a predetermined format machining data temporarily stored in the memory section 5.

The operation of the numerical control device thus constructed will be described.

First, the machining data for the machine tool recorded on the paper tape 1 is applied to the control section 3 by the input section 2. The machining data thus applied is analyzed by the control section 3 and converted into movable data by the movable arithmetic section 4. The control section 3 outputs the latter data, as operating instruction data for the machine tool 7, through the output section 6, and accordingly the machine tool 7 is automatically operated. The machining data can be temporarily stored in the memory section 5 if necessary.

The contents of the machining data or movable data can be displayed on the display unit (not shown) in the setting display section 8. The operator can edit the data by operating the keys on the operating board (not shown). The setting display section 8 can be used for diagnosis of the overall numerical control device, or for simulating machining conditions on the screen utilizing the machining data.

Thus, as mentioned above the setting display section 8 is used as a man-machine interface unit. However, the main purposes of the setting display section 8 are to allow the operator to input machining data and to allow the programmer to enter programs for automatic control of the machine tool 7. In general, the setting display section 8 includes a display unit and an operating board, which are provided in the numerical control device, used to enter machining data and to perform programming operations. The operator or the programmer operates the operating board to perform the data entering operation or the programming operation.

The setting display section 8 in the conventional numerical control device is a special setting display unit used for the numerical control section 10 only, which displays machining data or the like in a fixed form at all times.

In the conventional numerical control device designed as described above, the display by the setting display section is in a dedicated form. Furthermore, since a fixed data interface is employed for the data transmitting and receiving section, no setting display unit other than the above-described special setting display unit can be employed. In addition, it is impossible to display data in a desired form using ASCII codes or the like.

SUMMARY OF THE INVENTION

An object of the invention is to eliminate the above-described difficulties accompanying a conventional numerical control device.

In accordance with the above and other objects, the invention provides a numerical control device in which a numerical control section and a setting display section are serially interfaced with each other using ASCII code data or JIS eight-bit serial data, and the setting display section employs a general-purpose setting display device, and a high level language is employed as the control language so that data can be displayed in a desired form.

BRIEF DESCRIPTION OF THE DRAWINGS

FIG. 4 is a flow chart describing the operation of the embodiment shown in FIGS. 2 and 3.

DESCRIPTION OF THE PREFERRED EMBODIMENTS

Figure 1:
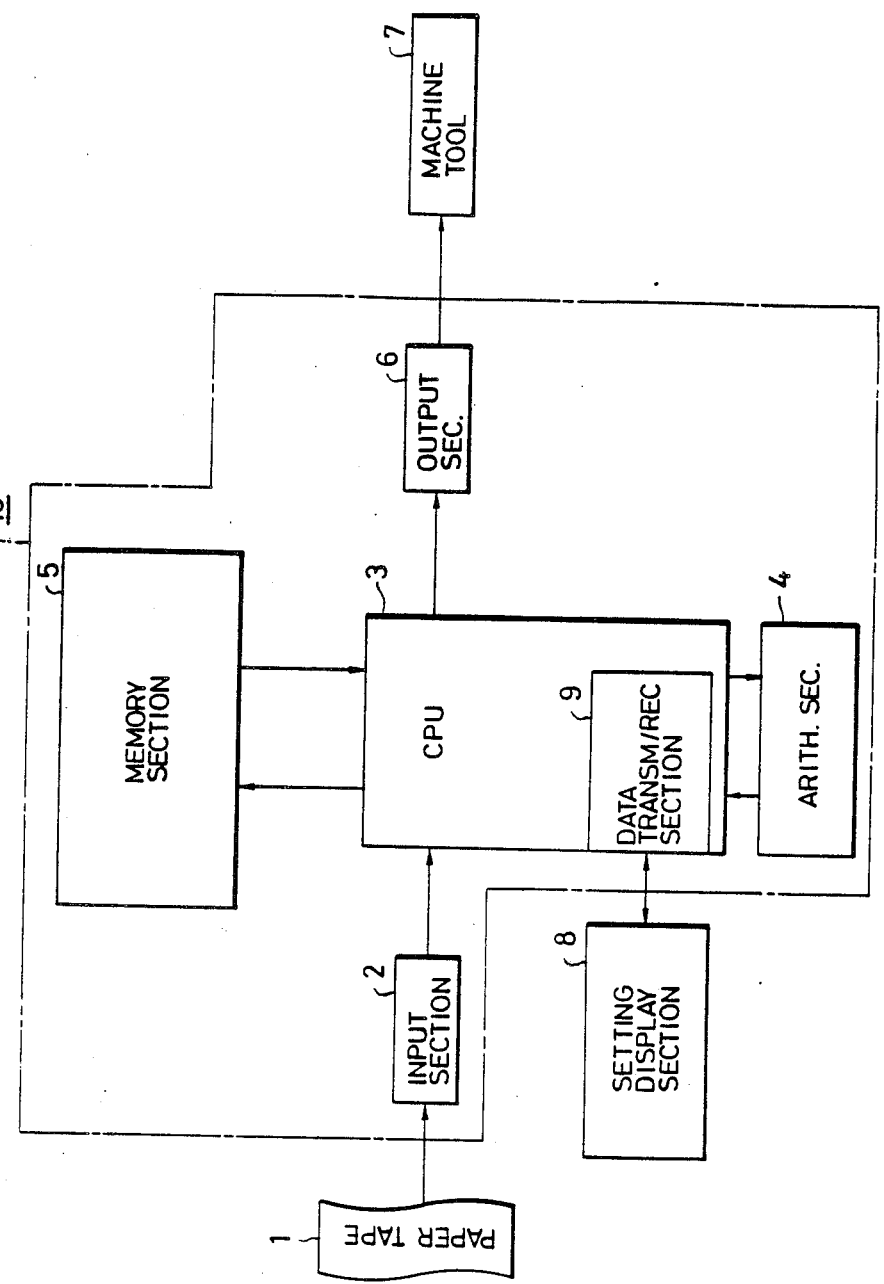
FIG. 1 is a block diagram showing the arrangement of a conventional numerical control device.
Figure 2:
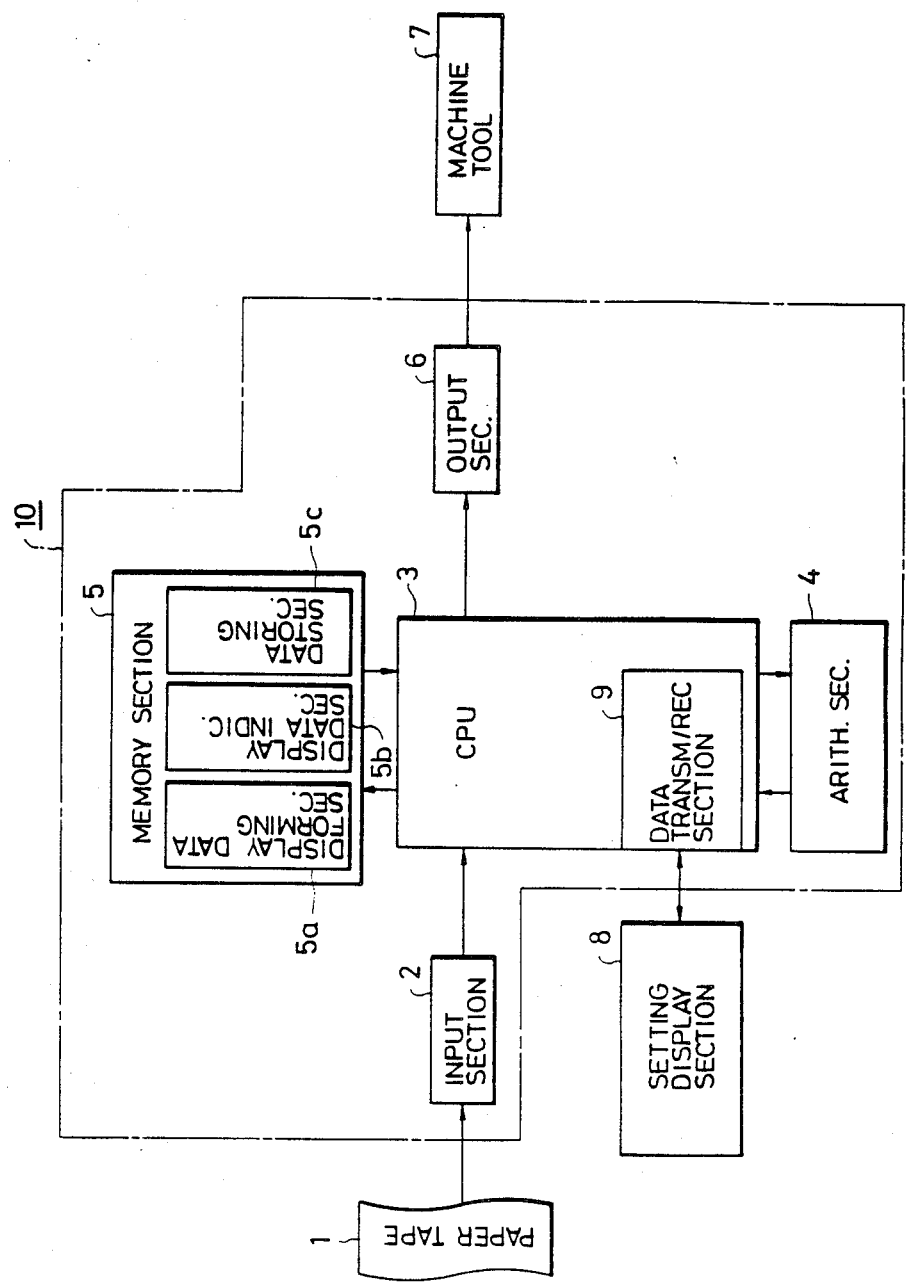
FIG. 2 is a block diagram showing the arrangement of a numerical control device according to an embodiment of the invention.

A preferred embodiment of the invention will be described with reference to FIG. 2. In FIG. 2, those components which have been previously described with reference to FIG. 1 are designated by the same reference numerals. Further in FIG. 2, reference numeral 3 designates a control section using a CPU which can operate in a high level language. The control section 3 includes a data transmitting and receiving section 9 which can perform a standard interfacing operation. The reason why operation in a high level language is required, is that, with a high level language, data can be entered or edited by programming, and if display data is stored in a RAM in the numerical control device and the addresses are specified, then the display data can be transmitted to the display unit. A general-purpose setting display section 8 (general-purpose setting display unit) connected to the data transmitting and receiving section 9 uses an ordinary personal computer which employs ASCII codes as cue codes and data codes. Interfacing the data transmitting and receiving section 9 (data transmitting and receiving element) 9 is carried out using a serial data interface RS232C based on the V24 international standard recommended by CCITT (International Telegraph and Telephone Consultative Committee). A memory section 5 in the control section 10 (numerical control unit) includes: a display data forming section 5a in which programs have been stored to form display data, a display data storing section 5c for data formed for display, and a display data indicating section 5b in which programs for indicated data to be displayed on the general-purpose display section 8 are stored.

The following TABLE shows a program whose purpose is to prepare display data for display on a CRT, as indicated by the comment at line number 100 of the TABLE. Line numbers 110 to 160 show the steps in the program and contain comments to explain the purpose of the steps, respectively.

TABLE

| | |
|---|---|
| 100 ; [CRT DISPLAY DATA] | |
| 110 A = $8000; N = 0 | Input 8000 into "A" register, and 0 into "N" register. |
| 120 INPUT "DATA" C | Store the key input in "C" register. |
| 130 POKE A + N, C; N = N + 1 | Store the content of "C" register of "C" in address A + N. Increase N. |
| 140 PRINT C, N | Display the contents of "C" and "N" registers. |
| 150 IF N > 1000 STOP; PRINT "END" | IF N > 1000, stop the program, and print "END". |
| 160 GO TO 120 | If N ≦ 1000, go to address 120. |

According to the above-described program, the inputted display data can be stored in addresses from $8000 to $8000 + 1000 in the display data memory section.

The operation of the numerical control device thus constructed will be described. The operation in which input data is read from the paper tape 2 to automatically operate the machine tool 7 is the same as that of the conventional numerical control device. Therefore, in the numerical control device of the invention, the operations of the general-purpose setting display section 8, which is capable of displaying display data in a desired form, and essential components of the numerical control section 10 will be described.

First, in the general-purpose setting display section 8, a program in a high level language for forming display data is entered. The program thus entered is inputted through the data transmitting and receiving section 9 to the control section 3 where it is stored in the display data forming section 5a. Thereafter, display conditions and display data are set by operating the keys of the general-purpose setting display section 8. The display conditions and the display data are applied through the data transmitting and receiving section 9 to the control section 3 for storage in the display data storing section 5c. The control section analyzes the data received through the data transmitting and receiving section 9, and, according to the contents of the display data indicating section 5b in which data to be displayed has been stored, the display data is transmitted through the data transmitting and receiving section 9 to the general-purpose setting display section 8 for display on a display screen such as that of a CRT (cathode-ray tube) (not shown).

Figure 3:
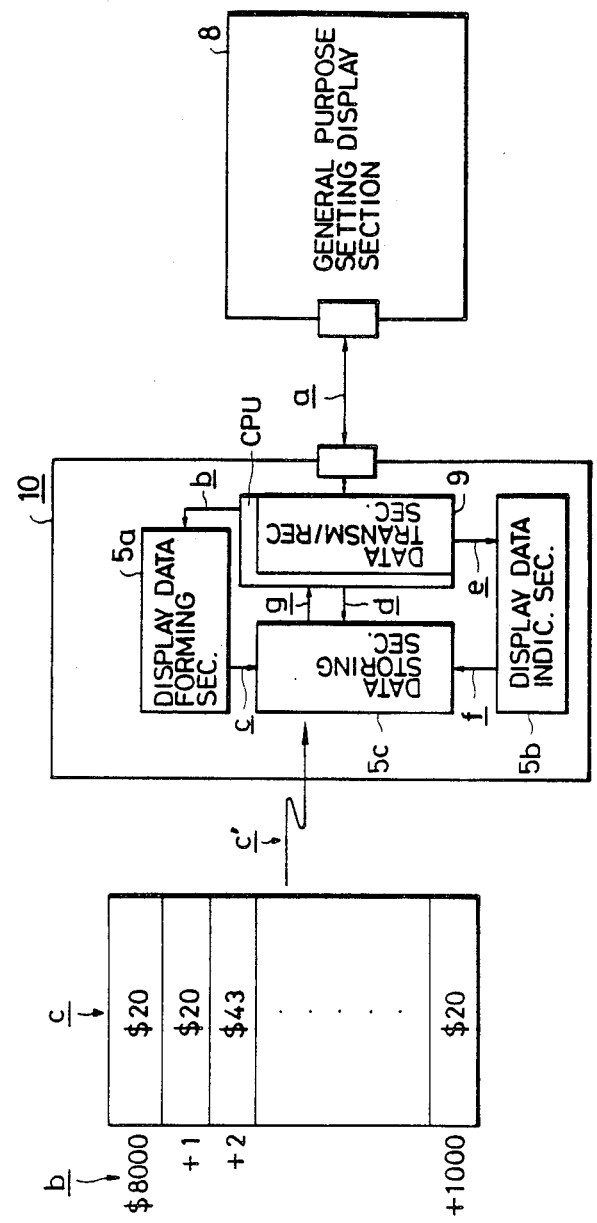
FIG. 3 is a functional diagram showing the flow of data in essential components in the device shown in FIG. 2.

The flow of the data handled in the above-described embodiment is as shown in FIG. 3. FIG. 4 is a flow chart describing the operation of the embodiment shown in FIGS. 2 and 3.

With reference to FIG. 3, when operation of the general purpose setting display section 8 is initiated by the operator, data is routed along the path a to b indicated in the drawing. Upon receipt of a data transmission signal, the display data is stored in the section 5c; that is formed using, e.g., the program shown in the Table, and the data moves along a path from a to c. When the section 8 is actuated, the display data top indicated in the drawing. Upon receipt of a data address stored in the section 5b is read by the section 3 through a route of a to e. With this address passing through a route of f, the display data is displayed on the CRT of the section while passing along a route of g to a.

The numerical control device includes the general-purpose setting display section 8, which may be a personal computer, and uses a standard interface, such as an RS232C interface, for the numerical control section. Furthermore, a high level language is employed as the control language. Therefore, character or graphic display of the data formed by the numerical control section 10 can be effected as desired within the range of capability of the general-purpose setting display section.

As is apparent from the above description, the numerical control device of the invention, which employs a general-purpose setting display unit in the setting display section, has a standard interface such as an RS232C interface, and uses a high level language. Therefore, with the numerical control device of the invention, data can be displayed on the display screen in a form which meets the requirements of the operator, and machining loci can be displayed. Furthermore, it is unnecessary to separately provide an exclusive setting display section. Accordingly, the numerical control device of the invention is economical and provides excellent display performance.

I claim:

1. A numerical control device for controlling operation of a machine tool, the device comprising:

general-purpose setting display means (8), including a display device, for displaying machining data of the machine tool on said display device in one of a group of forms including a first type of character form, a second type of character form, and a graphic form, which form of the machining data can be changed from any one in the group to any other in the group in accordance with a user's desires, said setting display means being further adapted for effecting internal data processing using a high level language; and numerical control means (10), having a data transmitting and receiving section (9) serially interfaced with said general-purpose setting display means, for transmitting display data using said high level language, said numerical control means further comprising a CPU (3) for numerical control of the operation of the tool; and memory means (5c) for temporarily storing said display data, wherein the machining data includes data for controlling the operation and data for monitoring the operation, the data for controlling the operation is unchanged by changes in form within the group, and wherein the first type of character form is a serial data form and the second type of character form is a data code form, whereby the type and format of the data displayed by said display device can be changed as desired by the user.

2. The numerical control device as claimed in claim 1, in which said general-purpose setting display means comprises a general-purpose personal computer.

3. The numerical control device as claimed in claim 1, in which said transmitting and receiving section comprises means for effecting data transmittal through a serial data interface.

* * * * *